United States Patent [19]
Tsai et al.

[11] Patent Number: 5,499,950
[45] Date of Patent: *Mar. 19, 1996

[54] BELT TENSIONER, ACTUATOR THEREFOR AND METHODS OF MAKING THE SAME

[75] Inventors: M. Michael Tsai, Rochester Hills; David E. Fletcher, Flint; Joseph W. Zamm, Rochester Hills, all of Mich.

[73] Assignee: Dayco Products, Inc., Dayton, Ohio

[ * ] Notice: The term of this patent shall not extend beyond the expiration date of Pat. No. 5,391,118.

[21] Appl. No.: 387,521

[22] Filed: Feb. 13, 1995

Related U.S. Application Data

[62] Division of Ser. No. 248,134, May 24, 1994, Pat. No. 5,391,118.

[51] Int. Cl.⁶ ............................................. F16H 7/08
[52] U.S. Cl. ................................................... 474/138
[58] Field of Search ........................... 474/101, 109–111, 474/113–117, 133–138

[56] References Cited

U.S. PATENT DOCUMENTS

| | | | |
|---|---|---|---|
| 4,657,524 | 4/1987 | Okabe | 474/133 |
| 4,743,224 | 5/1988 | Yoshikawa et al. | 474/101 |
| 4,938,735 | 7/1990 | Mitchell et al. | 474/133 |
| 5,391,118 | 2/1995 | Tsai et al. | 474/138 |

*Primary Examiner*—Michael Powell Buiz
*Attorney, Agent, or Firm*—Joseph V. Tassone

[57] ABSTRACT

A belt tensioner, an actuator therefor and methods of making the same are provided, the actuator of the tensioner having a rotatable shaft that is operatively interconnected to a spring and is provided with opposite ends one of which is operatively interconnected to a piston, the actuator having a casing provided with an internal recess therein that receives the other end of the shaft therein, the spring being adapted to rotate the shaft to extend the piston while the other end of the shaft rotates in the recess and bears against an end surface thereof, the other end of the shaft comprising a thrust washer assembled to the shaft to be carried thereby.

10 Claims, 2 Drawing Sheets

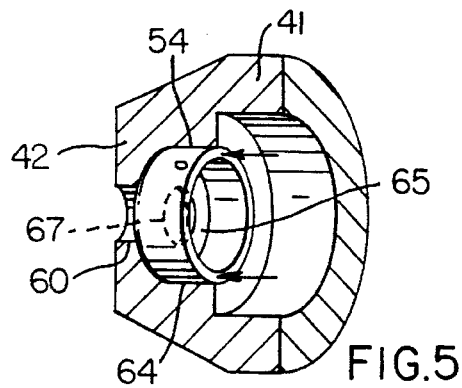
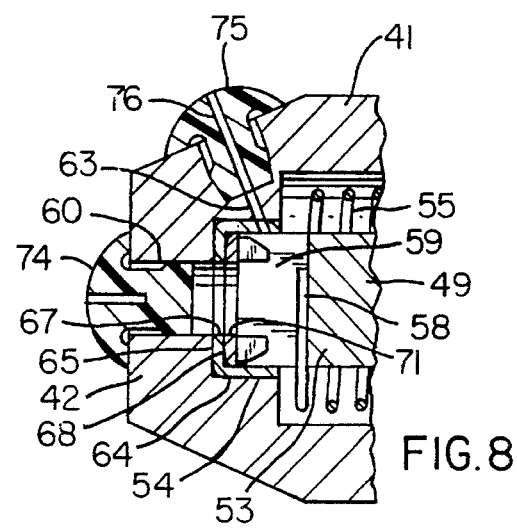
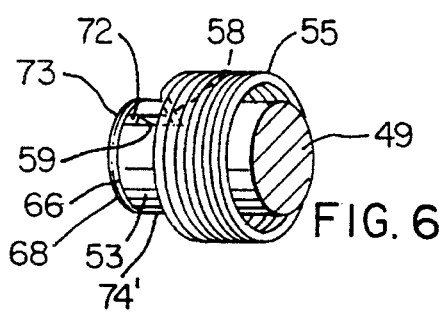
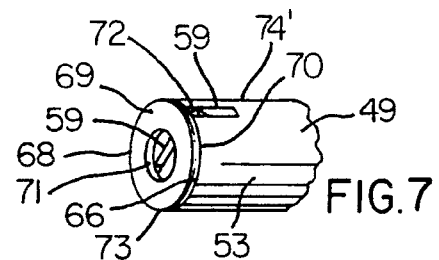
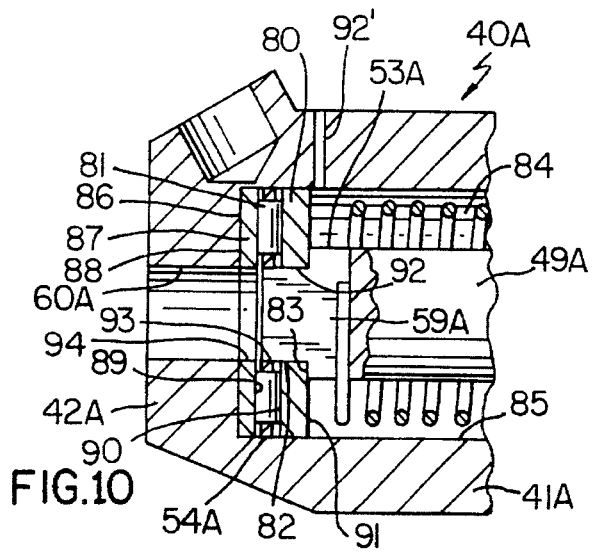
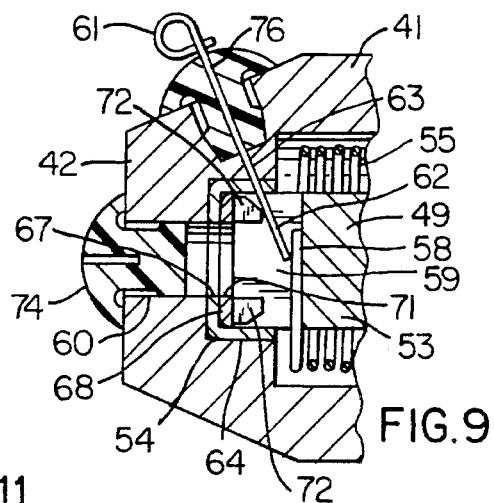
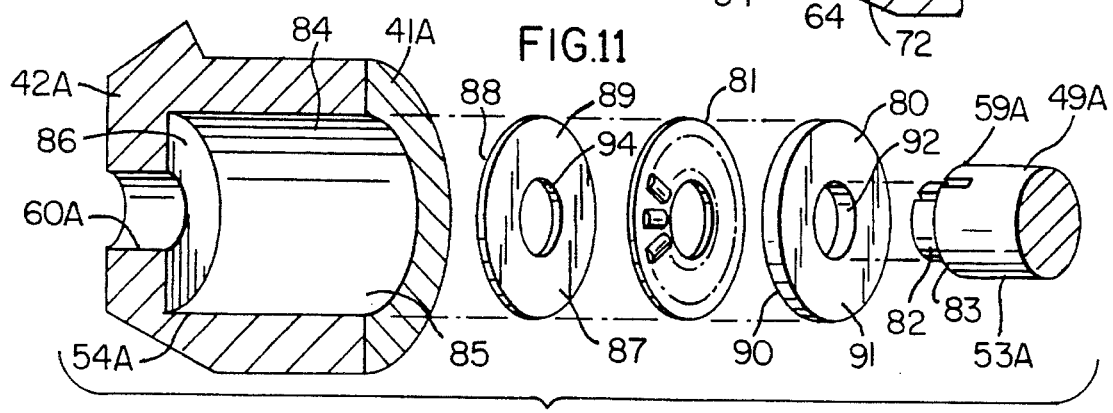

BELT TENSIONER, ACTUATOR THEREFOR AND METHODS OF MAKING THE SAME

CROSS REFERENCE TO RELATED APPLICATIONS

This application is a divisional patent application of its parent patent application, Ser. No. 248,134, filed May 24, 1994, now U.S. Pat. No. 5,391,118.

BACKGROUND OF THE INVENTION

1. Field of the Invention

This invention relates to a new belt tensioner and to a new actuator for such a belt tensioner as well as to new methods of making such a belt tensioner and such an actuator.

2. Prior Art Statement

It is known to provide a belt tensioner for an endless transmission belt construction arranged to move in a certain path, the tensioner comprising a support means, an arm pivotly mounted to the support means, a pulley rotatably carried by the arm for being disposed in engagement with the belt construction, and an actuator carried by the support means and having opposed ends, the actuator having a movable piston projecting out of one of the opposed ends thereof for being in engagement with the arm to pivot the arm in a direction to urge the pulley into the belt construction as the piston is extended outwardly from the one of the opposed ends of the actuator, the actuator having spring means therein that is operatively associated with the piston for urging the piston outwardly, the actuator having a rotatable shaft means that is operatively interconnected to the spring means and that is provided with opposite end means one of which is operatively interconnected to the piston, the actuator having a casing provided with an internal recess means therein that receives the other of the opposite end means of the shaft means therein, the recess means having end surface means, the spring means being adapted to rotate the shaft means to extend the piston while the other end means of the shaft means rotates in the recess means and bears against the end surface means thereof. For example, see the Mitchell et al, U.S. Pat. No. 4,938,735.

It is also known to utilize thrust washers between a rotating part and a stationary part, the thrust washer being disposed against a shoulder of one of the parts and having a projection of that part extending through the opening of the thrust washer. In addition, it is known to provide a thrust needle bearing washer between a pair of flat thrust washers. For example, see pages 418 and 419 of the *Torrington Service Catalog* of the Torrington Co. of Torrington, Conn. and having a copyright date of 1988.

SUMMARY OF THE INVENTION

It is one of the features of this invention to provide a new belt tensioner wherein a rotatable shaft means of the actuator thereof has improved means for preventing adverse friction to be created between the end means thereof and the end surface means of a recess means of the casing of the actuator during rotation of that shaft means relative thereto.

In particular, it was found according to the teachings of this invention that when a steel cap is press-fitted into the recess means of the casing, some deformation of the cap takes place so that when the end means of the shaft means rotates against that steel cap, a frictional force is generated at the juncture of a slot in the end means of the shaft means and the deformed portion of the steel cap.

Accordingly, it was found according to the teachings of this invention that a thrust washer means can be assembled to the shaft means to be carried thereby and comprise part of the end means thereof that bears against the end surface means of the recess means of the casing to tend to reduce or to eliminate the aforementioned adverse frictional force.

For example, one embodiment of this invention comprises a belt tensioner for an endless transmission belt construction arranged to move in a certain path, the tensioner comprising a support means, an arm pivotly mounted to the support means, a pulley rotatably carried by the arm for being disposed in engagement with the belt construction, and an actuator carried by the support means and having opposed ends, the actuator having a movable piston projecting out of one of the opposed ends thereof for being in engagement with the arm to pivot the arm in a direction to urge the pulley into the belt construction as the piston is extended outwardly from the one of the opposed ends of the actuator, the actuator having spring means therein that is operatively associated with the piston for urging the piston outwardly, the actuator having a rotatable shaft means that is operatively interconnected to the spring means and that is provided with opposite end means one of which is operatively interconnected to the piston, the actuator having a casing provided with an internal recess means therein that receives the other of the opposite end means of the shaft means therein, the recess means having end surface means, the spring means being adapted to rotate the shaft means to extend the piston while the other end means of the shaft means rotates in the recess means and bears against the end surface means thereof, the other end means of the shaft means comprising a thrust washer means assembled to the shaft means to be carried thereby.

Accordingly, it is an object of this invention to provide a new belt tensioner having one or more of the novel features of this invention as set forth above or hereinafter shown or described.

Another object of this invention is to provide a new method of making such a belt tensioner, the method of this invention having one or more of the novel features of this invention as set forth above or hereinafter shown or described.

Another object of this invention is to provide a new actuator for such a belt tensioner, the actuator of this invention having one or more of the novel features of this invention as set forth above or hereinafter shown or described.

Another object of this invention is to provide a new method of making such an actuator, the actuator of this invention having one or more of the novel features of this invention as set forth above or hereinafter shown or described.

Other objects, uses and advantages of this invention are apparent from a reading of this description which proceeds with reference to the accompany drawings forming a part thereof and wherein:

BRIEF DESCRIPTION OF THE DRAWINGS

FIG. 5 is a view similar to FIG. 3 and illustrates how the steel cap has been press-fitted into the casing of the actuator.

FIG. 6 is a view similar to FIG. 4 and illustrates how the thrust washer is assembled to the end of the shaft.

FIG. 7 is a fragmentary perspective view at another angle to the end of the shaft as illustrated in FIG. 6 with the spring means removed.

FIG. 8 is an enlarged fragmentary cross-sectional view of one end of the actuator of FIG. 2 and illustrates the end of the shaft also in cross-section.

FIG. 9 is a view similar to FIG. 8 and illustrates the actuator before the wound spring thereof has been released by a locking pin means of the actuator.

FIG. 10 is a view similar to FIG. 8 and illustrates another embodiment of the actuator of this invention.

FIG. 11 is a view similar to FIG. 3 and illustrates certain parts of the actuator of FIG. 10 in an exploded fragmentary perspective view thereof.

DESCRIPTION OF THE PREFERRED EMBODIMENTS

Figure 1:
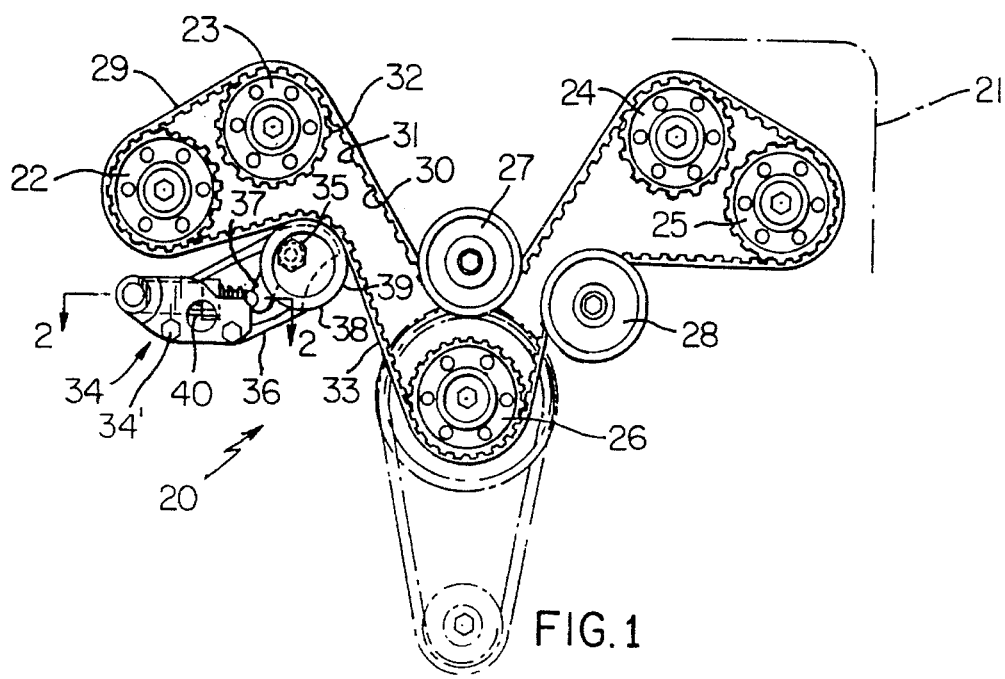
FIG. 1 is a schematic front view of an internal combustion engine of a transportation vehicle having the new belt tensioner of this invention thereon.

While the various features of this invention are hereinafter illustrated and described as being particularly adapted to provide a belt tensioner for a belt system of a particular configuration, it is to be understood that the various features of this invention can be utilized singly or in various combinations thereof to provide a belt tensioner for other belt systems as desired.

Therefore, this invention is not to be limited to only the embodiments illustrated in the drawings, because the drawings are merely utilized to illustrate one of the wide variety of uses of this invention.

Referring now to FIG. 1, a new belt tensioning system of this invention is generally indicated by the reference numeral 20 and is utilized with an internal combustion engine 21 that can be utilized for a transportation vehicle or the like, the belt tensioning system comprising the engine or support means 21 rotatably carrying a plurality of rotatable pulley means 22, 23, 24, 25, 26, 27 and 28. An endless transmission belt construction 29 is trained about the pulleys 22–28 in the manner illustrated in FIG. 1 to provide a driving relationship in a manner well known in the art. For example, see the Ojima et al, U.S. Pat. Nos. 4,702,726, 4,722,720 and the Yoshikawa et al, U.S. Pat. No. 4,743,224, whereby these three U.S. patents are being incorporated into this disclosure by this reference thereto.

The belt construction 29 as illustrated in FIG. 1 comprises a timing belt construction that has its inner side 30 defining a plurality of teeth 31 that are adapted to mesh with teeth 32 on the pulleys 22, 23, 24, 25, and 26 in a manner well known in the art. The other side 33 of the belt construction 29 is substantially smooth and provides a driving relationship with the non-toothed pulleys 27 and 28 also in a manner well known in the art.

The belt tensioning system 20 of this invention also comprises a belt tensioner of this invention that is generally indicated by the reference numeral 34 in FIG. 1, the belt tensioner 34 comprising a support means or bracket means 36 that is mounted to the engine or support means 21 by a pair of fastening bolts, such as the bolt 34' illustrated in FIG. 1, arm 37 pivotally mounted to the support means or bracket means 36, a pulley 38 rotatably carried by the arm 37 and fastened thereto by bolt 35 while having a smooth outer periphery 39 placed in engagement with the smooth side 33 of the belt construction 29, and an actuator 40 carried by the support means or bracket means 36 in a manner fully set forth in the aforementioned Mitchell et al, U.S. Pat. No. 4,938,735 whereby this U.S. patent is being incorporated into this disclosure by this reference thereto.

Since the belt tensioner 34 and the actuator 40 are substantially identical to the belt tensioner and the actuator disclosed in the aforementioned Mitchell et al, U.S. Pat. No. 4,938,735, only the details thereof that are believed necessary to fully understand the features of this invention will be hereinafter set forth.

Figure 2:
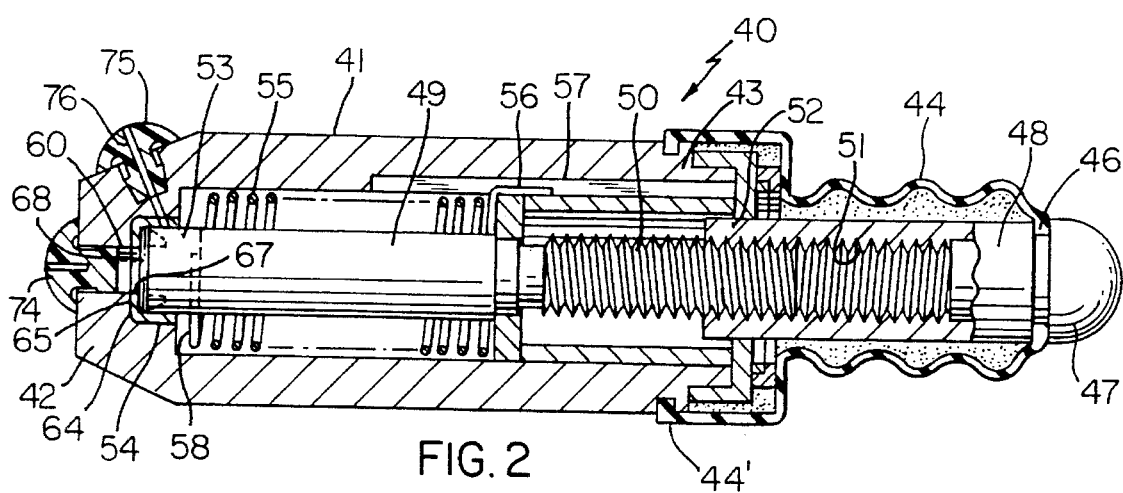
FIG. 2 is an enlarged cross-sectional view of the actuator of the belt tensioner of FIG. 1 and is taken in the direction of the arrows 2—2 of FIG. 1.
Figure 3:
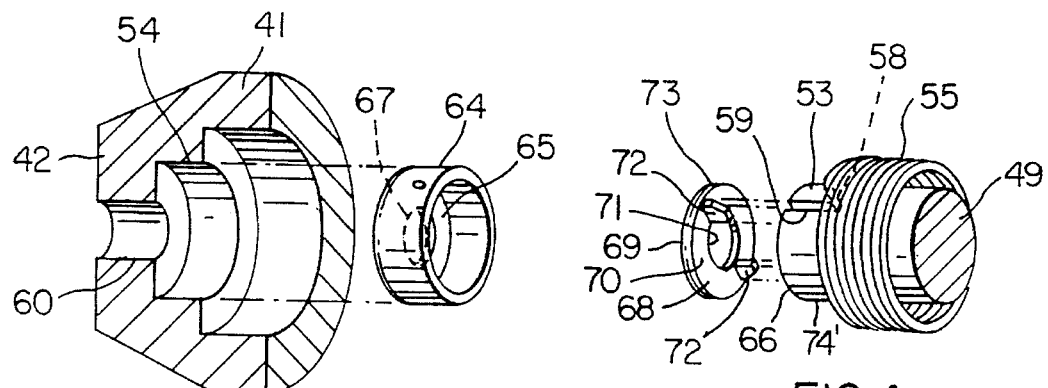
FIG. 3 is an exploded perspective view with part of the casing of the actuator being in cross-section and illustrating how a steel cap is to be press-fitted into the recess means of the casing.
Figure 4:
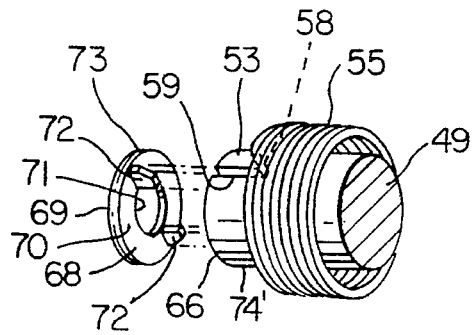
FIG. 4 is a fragmentary exploded perspective view of one end of the shaft of the actuator of FIG. 2 and illustrating how a thrust washer is to be assembled thereto.

Referring now to FIG. 2, the actuator 40 comprises a metallic casing or housing 41 having a closed end 42 and an opposite open end 43 closed by a flexible boot 44 that has its outer peripheral edge means 44' secured to the casing 41 at the open end 43 thereof and the inner peripheral edge means 46 interconnected to an end 47 of a piston 48 that is adapted to extend outwardly from the open end 43 of the casing 41 or be retracted toward the same depending upon the direction of rotation of a metallic shaft means or rod 49 having one end 50 thereof being externally threaded and being threadedly received in an internally threaded opening 51 in the end 52 of the piston 48, the shaft means 49 having an opposite end means 53 disposed in a recess means 54 formed in the end 42 of the casing 41 so as to rotate therein in a manner hereinafter set forth.

A coiled torsion spring 55 is disposed in the casing 41 in telescoped relation on the shaft means 49 and has one end 56 fixed in a slot 57 of the casing 41 and another end 58 disposed in a slot 59 formed in the end 53 of the shaft means 49, the slot 59, in effect, bisecting the end 53 so as to be in aligned relation with an opening 60 formed in the end 42 of the casing 41 for a purpose hereinafter set forth. The spring 55 is so wound that the same tends to rotate the shaft means 49 in a direction that will extend the piston 48 outwardly relative to the casing 41 and, therefore, will tend to urge the arm 37 in a direction to force the pulley 38 against the side 33 of the belt construction 29 to tension the belt construction 29 all in the manner fully described in the aforementioned Mitchell et al, U.S. Pat. No. 4,938,735.

Before the actuator 40 is assembled in the bracket or support means 36 of the tensioner 34, the spring 55 is prewound in a direction that places the piston 48 in its fully retracted position and in order to hold the shaft means 49 from rotating under such condition, a locking pin 61 has an end 62 thereof inserted through an opening means 63 in the end 42 of the casing 41 in the manner illustrated in FIG. 9 to be received within the slot 59 of the shaft means 41 so as to prevent rotation of the shaft means 49 under the force of the wound spring means 36. However, after the actuator 40 is assembled in the bracket 36 of the tensioner 34, and the tensioner 34 is assembled in the system 20, the locking pin 61 is removed and the wound force of the spring 55 tends to rotate the shaft 49 in a direction to extend the piston 48 outwardly and thereby urge the pulley 38 in a direction to tension the belt construction 29 for the reasons previously set forth.

The recess means 54 of the casing 41 has a steel cap or cup 64 press-fitted therein so that the closed end 65 of the cap 64 forms an end surface means against which the end means 53 of the shaft means 49 is to bear and rotate thereagainst, the end means 53 of the shaft means 49 bearing against such end surface means 65 as the shaft means 49 is being urged toward the end 42 of the casing 41 through the force of the belt construction 29 tending to retard the outward movement of the piston 48.

As previously set forth, it has been found that when the flat end surface 66 of the shaft means 49 directly bears against the end surface means 65 of the cup or cap 64, an adverse galling effect will be created.

In particular, the end surface means 65 of the cap 64 has a central opening 67 passing therethrough to align with the opening 60 in the end 42 of the casing 41 so as to provide access to the slot 59 in the end 53 of the shaft means 49 so that the actuator 40 can be preset to a specific extension distance of the piston 48 prior to assembly of the actuator 40 in the tensioner 34 or to permit the piston 48 to be set to a specific extension distance prior to disassembly of the actuator 40 from the tensioner 34.

However, it has been found that when the cap 64 is pressed into the recess 54 of the casing 41 during the assembly of the actuator 40, some deformation of the cap 64 takes place and when the shaft means 49 has the end surface 66 thereof subsequently rotated against the end surface means 65 of the thus deformed cap 64, a frictional force is generated at the juncture of the slot 59 in the end 53 of the shaft 49 and the deformed portion of the cap 64.

Therefore, it was found according to the teachings of this invention that a flat thrust washer 68 can be assembled to the shaft means 49 to form part of the end means 53 thereof to tend to reduce or to eliminate the aforementioned adverse frictional force between the deformed cap 64 and the shaft means 49.

The thrust washer 68 has opposed flat sides 69 and 70 with a central opening 71 passing therethrough to align with the opening 67 in the cup 64 to provide access to the slot 59 for the adjustment purposes previously set forth.

The side 70 of the thrust washer 68 has two integral tabs or tangs 72 which are disposed in spaced apart relation on a diameter thereof so that the same will be respectively received in the slot 59 at the end means 53 of the shaft means 49 in the manner illustrated in FIGS. 4, 6, 7 and 8 to place the flat surface 70 of the thrust washer 68 against the flat surface 66 of the shaft means 49 so that the thrust washer 68 is carried by the shaft means 49 and becomes part of the end means 53 thereof.

If desired, the ears or tangs 72 could be press-fitted into the slot means 59 to ensure that the thrust washer 68 will not fall off of the shaft means 49 after having been assembled thereto but it is not necessary for such a press-fit relationship to exist.

In any event, it can be seen that the outer peripheral surface 73 of the thrust washer 68 is defined by approximately the same diameter as the external peripheral surface 74' of the end 53 of the shaft means 48 when the thrust washer 68 and the shaft means 49 are coaxially assembled together.

In this manner, when the shaft means 49 has the end means 53 now disposed in the recess means 54 of the casing 41 as illustrated in FIGS. 2, 8 and 9, the flat surface 69 of the thrust washer 68 now engages against the end surface means 65 of the cup 64 and provides for less frictional force being created between the deformed cup 64 and the thrust washer 68 than when the thrust washer 68 is not being utilized therewith.

Therefore, it can be seen that it is a relatively simple method of this invention to form the thrust washer 68 and assemble the same to the shaft means 49 before the shaft means 49 is assembled in the casing 41 so as to provide a thrust washer means between the end surface means 65 of the recess means 54 of the casing 41 and the end surface means 53 of the shaft means 49 for the reasons previously set forth. Thus, the thrust washer 68 readily permits adjustment of the shaft means 49 by a person removing a flexible sealing cap means 74 from the opening 60 in the end 42 of the casing 41 and then adjusting the shaft means 49 through a suitable tool reaching into the slot 59 in the shaft means 49 after passing through the aligned openings 67 and 71 in the cup 64 and the thrust washer 68. The sealing plug 74 can be replaced after such adjustment.

A similar sealing plug 75 is provided for the opening 63 in the casing 41 except that the plug 75 has an opening 76 passing therethrough to permit the locking pin 61 to be inserted therethrough or be removed therefrom when desired.

While the thrust washer 68 of this invention can have any suitable dimensions and can be formed of any suitable material, one working embodiment thereof has an outside diameter of approximately 9 mm and a thickness of 1 mm with the length of the tangs 72 being approximately 2 mm in a direction away from the flat surface 70 of the thrust washer 68. In such one working embodiment of the thrust washer 78, the same is formed of iron having 1.5% nickel and 0.5% carbon therein. The shaft means 49 is formed of S45C with a surface treatment of KANIGEN PL while the cap 64 is formed of S45CFS also with a surface finish of KANIGEN PL, such terms being JIS Japanese standards. However, it also is believed that the thrust washer 68 can be formed of powdered metal if desired.

While the specific dimensions and materials of one working embodiment of the thrust washer means 68 of this invention has been set forth above, it is to be understood that this invention is not to be limited to such dimensions and such materials as the same are given merely as one example of this invention.

Referring now to FIGS. 10 and 11, another actuator of this invention is generally indicated by the reference numeral 40A and parts thereof similar to the parts of the actuator 40 previously described are indicated by like reference numerals followed by the reference letter "A" it being understood that the actuator 40A can be substituted for the actuator 40 in the tensioner 34 to form another tensioner of this invention and, therefore, such other tensioner need not be described or illustrated.

As illustrated in FIGS. 10 and 11, the shaft means 49A that is disposed in the casing 41A of the actuator 40A has the end means 53A thereof comprising a flat thrust washer 80 and a flat needle bearing thrust washer 81 respectively telescoped on a reduced projection 82 of the shaft means 49A that defines an annular flat shoulder 83 against which the thrust washers 80 and 81 are disposed in stacked relation.

In addition, the casing 41A has an internal chamber 84 defined by an internal peripheral surface means 85 of the casing 41A and with that surface means 85 extending all the way to a flat surface means 86 at the end 42A of the casing 41A whereby the flat surface means 86 and the adjacent portion of the surface means 85 defines the recess means 54A that is to receive the end means 53A of the shaft means 49A therein. However, another flat thrust washer 87 is press-fit into the recess means 54A so that a flat side 88 thereof engages against the surface means 86 of the casing 41A and the other flat side 89 thereof will be disposed against the needle thrust bearing washer 81 as illustrated.

Thus, it can be seen that the flat side 89 of the thrust washer 87 that is carried by the casing 41A defines an end surface means 89 of the recess 54A against which the needle thrust bearing 81 engages so that any frictional forces being created by the thrust washer 87 deforming during its press fit assembly in the casing 41A will be minimized or eliminated by the thrust washer 81, as well as by the thrust washer 80 being disposed in stacked relation against the shoulder 83 of the shaft means 49A.

In particular, the thrust washer 80 has opposed flat sides 90 and 91 with the side 90 being engaged by the thrust needle bearing 81 and the side 91 thereof bearing against the annular shoulder 83 of the shaft means 49A, the thrust washers 81 and 80 respectively having central openings 92 and 93 passing therethrough and receiving the projection 82 of the shaft means 49A therein. If desired, the dimensions of the projection 82 and openings 92 and 93 of the thrust washers 80 and 81 could be so selected that the projection 82 is press-fit into the openings 92 and 93 of the thrust bearings 80 and 81 so that the same will remain in assembled relation on the projection 82 before the shaft means 49A is disposed in the casing 41A.

In any event, it can be seen that the thrust washer 87 that is carried by the casing 41A also has a central opening 94 passing therethrough which is disposed in aligned relation with the opening 60A in the end 42A of the casing 41A to permit a suitable tool to be inserted therethrough to reach into the slot means 59A of the shaft means 49A for the actuator adjustment purposes previously described for the actuator 40.

In one working embodiment of the actuator 40A, the flat thrust washer 80 is thicker than the flat thrust washer 87, the flat thrust washer 80 being approximately 1.55 mm thick with a diameter of approximately 6.22 mm whereas the flat thrust washer 87 is approximately 0.78 mm thick with a diameter of approximately 6.22 mm. The flat needle bearing thrust washer 81 is approximately 1.96 mm thick and has a diameter of approximately 6.22 mm. The needle bearing washer can comprise a part NTA-411 while the flat thrust washers 80 and 87 respectively comprise parts TRB-411 and TRA-411 that are sold by the Torrington Company of Torrington, Conn. and respectively set forth on pages 418 and 419 of the aforementioned *Torrington Service Catalog* whereby these two pages are being incorporated into this disclosure by this reference thereto.

It can be seen in FIG. 10 that since the thrust washers 80, 81 and 87 in their assembled relationship in the actuator 40A might cover up an opening, such as opening 62, in the casing 41A for receiving a locking pin similar to the locking pin 61 previously described, another opening 92' could be formed through the casing 41A to permit a locking pin to reach the slot means 59A of the shaft means 49A for the same reasons as the locking pin 61 previously described.

Therefore, it can be seen that this invention not only provides a new belt tensioner and a new method of making the same, but also this invention provides a new actuator for such a belt tensioner and a new method of making such an actuator.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a belt tensioner for an endless transmission belt construction arranged to move in a certain path, said tensioner comprising a support means, an arm pivotally mounted to said support means, a pulley rotatably carried by said arm for being disposed in engagement with said belt construction, and an actuator carried by said support means and having opposed ends, said actuator having a movable piston projecting out of one of said opposed ends thereof for being in engagement with said arm to pivot said arm in a direction to urge said pulley into said belt construction as said piston is extended outwardly from said one of said opposed ends of said actuator, said actuator having spring means therein that is operatively associated with said piston for urging said piston outwardly, said actuator having a rotatable shaft means that is operatively interconnected to said spring means and that is provided with opposite end means one of which is operatively interconnected to said piston, said actuator having a casing provided with an internal recess means therein that receives the other of said opposite end means of said shaft means therein, said recess means having end surface means, said spring means being adapted to rotate said shaft means to extend said piston while said other end means of said shaft means rotates in said recess means and bears against said end surface means thereof, said end surface means of said recess means comprising a cup-shaped cap press-fitted into said casing and having a closed end and an open end receiving said other end means of said shaft means therein, said closed end of said cap having an opening means passing therethrough, said other end means of said shaft means having an opening means aligned with said opening means of said cap, the improvement wherein said other end means of said shaft means comprises a thrust washer means assembled to said shaft means to be carried thereby and having an opening means passing therethrough and being aligned with said opening means of said cap and said opening means of said shaft means.

2. A tensioner as set forth in claim 1 wherein said thrust washer means rotates in unison with said shaft means.

3. A tensioner as set forth in claim 2 wherein said thrust washer means has projection means disposed in said opening means of said shaft means to spline said thrust washer means to said shaft means.

4. A tensioner as set forth in claim 3 wherein said opening means of said shaft means comprises a slot, said projection means of said thrust washer means comprising two spaced apart tangs respectively disposed on opposite ends of said opening means of said thrust washer means and being received in said slot.

5. A tensioner as set forth in claim 4 wherein said opening means of said cap is substantially circular and said opening means of said thrust washer means is substantially circular, said slot being substantially a straight line.

6. In an actuator for belt tensioner for an endless transmission belt construction arranged to move in a certain path, said tensioner comprising a support means and an arm pivotally mounted to said support means and rotatably carrying a pulley for being disposed in engagement with said belt construction, said actuator having opposed ends and having a movable piston projecting out of one of said opposed ends thereof for being in engagement with said arm to pivot said arm in a direction to urge said pulley into said belt construction as said piston is extended outwardly from said one of said ends of said actuator, said actuator having spring means therein that is operatively associated with said piston for urging said piston outwardly, said actuator having a rotatable shaft means that is operatively interconnected to said spring means and that is provided with opposite end means one of which is operatively interconnected to said piston, said actuator having a casing provided with an internal recess means therein that receives the other of said opposite end means of said shaft means therein, said recess means having end surface means, said spring means being adapted to rotate said shaft means to extend said piston while said other end means of said shaft means rotates in said recess means and bears against said end surface means thereof, said end surface means of said recess means comprising a cup-shaped cap press-fitted into said casing and having a closed end and an open end receiving said other end means of said shaft means therein, said closed end of said cap having an opening means passing therethrough, said other end means of said shaft means having an opening means aligned with said opening means of said cap, the improvement wherein said other end means of said shaft means comprises a thrust washer means assembled to said shaft means to be carried thereby and having an opening means passing therethrough and being aligned with said opening means of said cap and said opening means of said shaft means.

7. An actuator as set forth in claim 6 wherein said thrust washer means rotates in unison with said shaft means.

8. An actuator as set forth in claim 7 wherein said thrust washer means has projection means disposed in said opening means of said shaft means to spline said thrust washer means to said shaft means.

9. An actuator as set forth in claim 8 wherein said Opening means of said shaft means comprises a slot, said projection means of said thrust washer means comprising two spaced apart tangs respectively disposed on opposite ends of said opening means of said thrust washer means and being received in said slot.

10. An actuator as set forth in claim 9 wherein said opening means of said cap is substantially circular and said opening means of said thrust washer means is substantially circular, said slot being substantially a straight line.

\* \* \* \* \*